United States Patent
Suh

(10) Patent No.: US 6,204,841 B1
(45) Date of Patent: Mar. 20, 2001

(54) PROGRAMMED RECORDING DEVICE AND METHOD OF CABLE TELEVISION BROADCASTING SIGNAL

(75) Inventor: Jung-Soo Suh, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/890,353

(22) Filed: Jul. 9, 1997

(30) Foreign Application Priority Data

Jul. 19, 1996 (KR) .................................................. 96-29416

(51) Int. Cl.[7] ...................................................... G06F 13/00
(52) U.S. Cl. ............................................................... 345/327
(58) Field of Search ................................... 345/327; 348/6, 348/7, 10, 12, 460, 552

(56) References Cited

U.S. PATENT DOCUMENTS

| | | | |
|---|---|---|---|
| 5,473,442 | * 12/1995 | Kim et al. ........................ | 348/10 X |
| 5,559,550 | * 9/1996 | Mankovitz ............................... | 348/6 |
| 5,692,214 | * 11/1997 | Levine ............................... | 348/906 X |

* cited by examiner

Primary Examiner—Nathan Flynn
(74) Attorney, Agent, or Firm—Dilworth & Barrese, LLP

(57) ABSTRACT

A programmed recording device and method of a CATV broadcast. The device and method determines if the current mode is a CATV broadcast recording mode when the current time reaches a programmed recording start time in a programmed recording mode, and if so, the programmed channel of a cable converter is moved to a valid channel as well as the mode of the cable converter is changed to a CATV broadcast receiving mode. The device and method enable a safe programmed recording of the CATV broadcast by automatically transmitting a channel-up code to convert the programmed CATV channel to a valid channel in case that the programmed channel is an invalid channel, and then transmitting the programmed channel code.

3 Claims, 3 Drawing Sheets

PROGRAMMED RECORDING DEVICE AND METHOD OF CABLE TELEVISION BROADCASTING SIGNAL

BACKGROUND OF THE INVENTION

1. Field of the Invention

The present invention relates to a programmed recording method of a cable television (CATV) broadcasting signal, and more particularly to a method of performing programmable recording of the CATV broadcasting signal which a viewer desires to watch by automatically transmitting a channel-up code so as to direct the CATV channel to a valid channel for recording especially when the current CATV channel is an invalid channel.

2. Description of the Prior Art

Generally, CATV broadcasting signals are scrambled when transmitted to subscribers, so that only subscribers having a converter box or a computer built into a television-video cassette recorder (TV-VCR) system can obtain the benefit or enjoyment of viewing or programmed recording of the CATV signals.

CATV converters have been manufactured by many manufacturers, and some of them have the characteristics in that if the converter is set at a channel not designated for programmed recording of the CATV channel signal, the channel signal is not recorded. Instead, the previous channel signal is recorded. For example, referring to FIG. 1, if the previous channel is '30' for sports and an invalid channel of the current CATV broadcast is '12' in case of the programmed recording of a channel '31' of the Catch-one CATV broadcast, the viewer may set the Catch-one channel '31' by sequentially selecting the numeral keys '3' and '1' in a remote controller. When '3' is first selected, due to the characteristic of the converter, channel '30' is first posted on the converter. If the second numeral is pressed after a time delay, the converter treats the second numeral '1' as corresponding to an invalid channel and does not switch to the newly selected channel. Thus when the programmed recording time is arrived after a predetermined time, the previous channel '30' for sports is selected and recorded.

As a result, the CATV channel signal set by the viewer for the programmed recording thereof cannot be recorded since the programmed channel is converted to the previous channel due to the characteristic of the converter even though channel data is transmitted.

SUMMARY OF THE INVENTION

It is an object of the present invention is to solve the problems involved in the prior art, and to provide a programmed recording method of a CATV broadcast which can perform programmable recording of the CATV broadcast by automatically transmitting a channel-up code to convert the programmed CATV channel to a valid channel in the event that the CATV channel is an invalid channel.

In order to achieve the above object, there is provided a programmed recording method of a CATV broadcast comprising the steps of determining whether a current time reaches a start time for programmed recording in a programmed recording mode; determining whether a current mode is a CATV broadcast recording mode when the current time reaches the start time for programmed recording; moving a programmed CATV broadcast channel to a valid channel if the current mode is the CATV broadcast recording mode; and converting a current mode of a cable converter to a receiving mode and converting a current mode of a recorder/player to a recording mode when the movement to the valid channel is completed.

BRIEF DESCRIPTION OF THE DRAWINGS

The above object, and other features and advantages of the invention will become apparent by describing the preferred embodiment thereof with reference to the accompanying drawings, in which.

DETAILED DESCRIPTION OF THE PREFERRED EMBODIMENT

Figure 1:
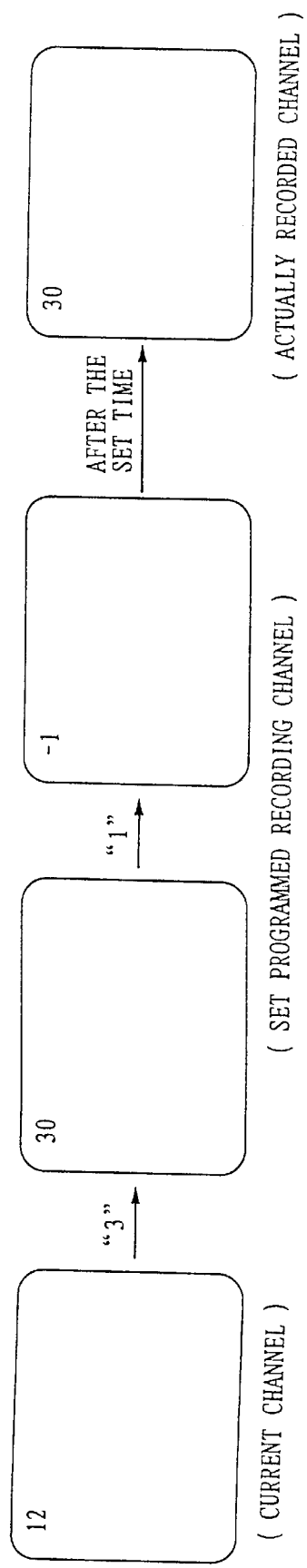
FIG. 1 is a view explaining the programmed recording state of a CATV broadcast in case that the previous channel of the cable converter is an invalid channel.
Figure 2:
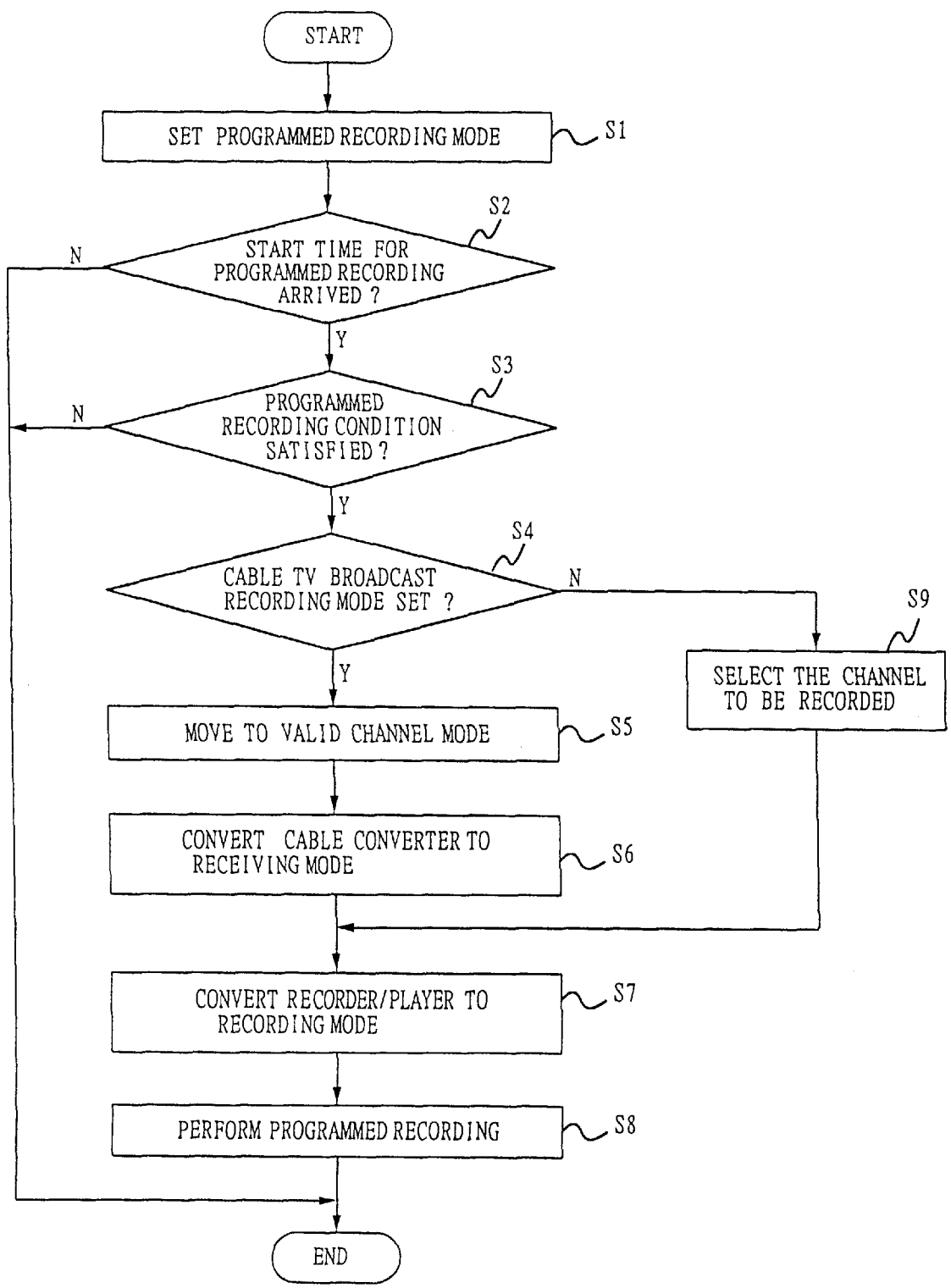
FIG. 2 is an algorithm diagram incorporating the programmed recording method of a CATV broadcast according to the present invention.
Figure 3:
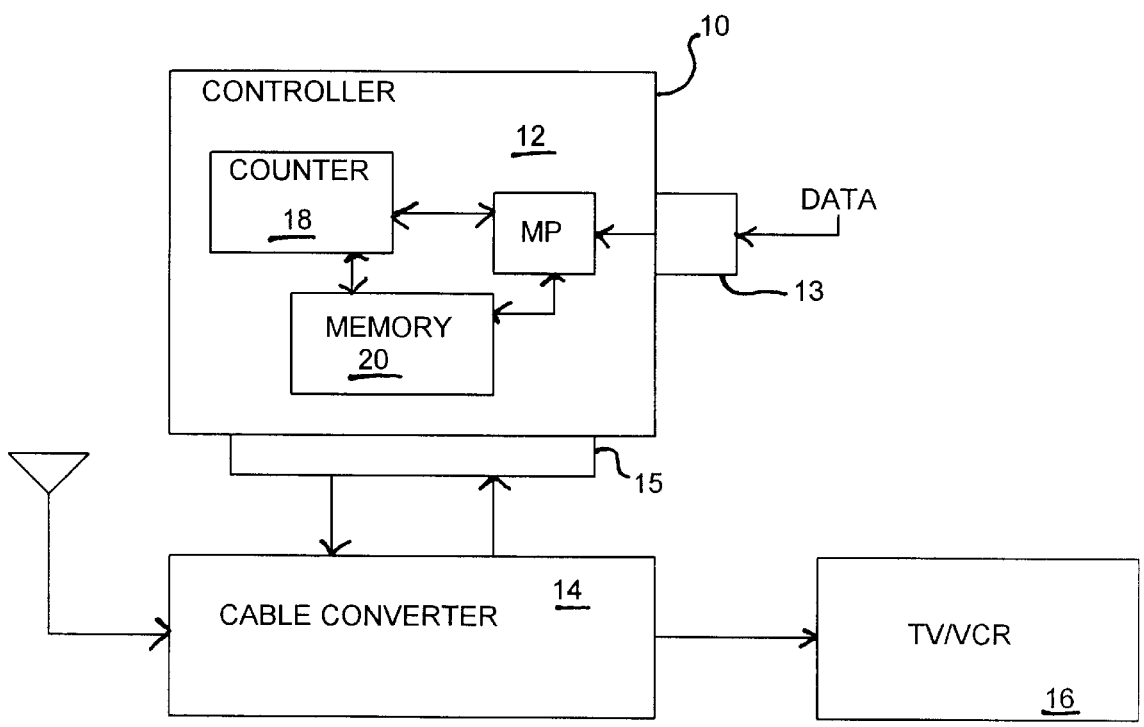
FIG. 3 is a block diagram of a programmed recording apparatus of a CATV broadcast according to the present invention.

A programmed recording apparatus of a CATV broadcast incorporating the method according to the present invention is shown by FIG. 3 and designated generally by reference numeral 10. The apparatus 10 includes a system controller 12 having a microprocessor ($\mu$P) and a memory 20 storing programmed instructions for controlling a cable converter 14 and performing other functions. The cable converter 14 receives a CATV broadcasting signal and provides the CATV signal to a TV-VCR system 16. The microprocessor of the system controller 12 receives data of a programmed recording time and channel from a user via a data input port 13, and determines whether the current time has reached the programmed recording time by using a counter 18, as further described below with reference to FIG. 2. The system controller 12 then controls the operation of the cable converter 14 via an interface 15 which in turn controls the operation of the TV-VCR system 16. The system controller 12 can also be configured to control other peripheral devices.

The programmed recording process of the CATV broadcast according to the present invention will be explained in detail with reference to FIG. 2.

Referring to FIG. 2, if a user selects a programmed recording time and a programmed recording mode for performing the programmed recording of a CATV broadcast (step S1), the system controller 12 stores the programmed recording time, within the memory 20 and continually checks whether the current time reaches the start time for the programmed recording by counting the current time (step S2). When the current time reaches the start time for programmed recording, the system controller 12 checks if the programmed recording condition is satisfied, for example, if the recording medium, such as a VCR tape, is placed in a VCR (step S3).

If the programmed recording condition is satisfied, the system controller determines whether the programmed recording mode is a CATV broadcast recording mode (step S4). If so, the system controller 12 changes the CATV broadcast channel to a valid channel (step S5), and changes the present mode of the cable converter 14 into a receiving mode (step S6).

Thereafter, the system controller 12 directs the present mode of the recorder/player into a recording mode (step S7), and controls the recording of the received CATV broadcast data (step S8).

From the foregoing, according to the present invention, a proper channel is automatically selected if the CATV channel of the cable converter 14 is an invalid channel when the CATV recording command is selected, resulting in recording of the CATV broadcast programmed as selected by the viewer.

While the present invention has been described and illustrated herein with reference to the preferred embodiment thereof, it will be understood by those skilled in the art that various changes in form and details may be made therein without departing from the spirit and scope of the invention.

What is claimed is:

1. A device for performing a programmed recording method of a cable television (CATV) broadcast for controlling cable converter circuitry coupled to a video cassette recorder, said device comprising:

an interface for interfacing said device to said cable converter circuitry;

a data input port for receiving data including information relating to a programmed recording time and channel; and a memory for storing programmable instructions therein for controlling said cable converter circuitry for performing said programmed recording method of said CATV broadcast according to said received programmed recording time and channel, said method comprising the steps of:

(a) determining whether a current time reaches said programmed recording time for programmed recording in a programmed recording mode;

(b) determining whether a current mode is a CATV broadcast recording mode when said current time reaches said programmed recording time for said programmed recording;

(c) changing a programmed CATV broadcast channel to said programmed channel if said programmed channel is a broadcasting channel and if said current mode is said CATV broadcast recording mode;

(d) changing to a broadcasting channel if said programmed channel is not a broadcasting channel; and (e) converting a current mode of said cable converter circuitry to a receiving mode and converting a current mode of a recorder/player to a recording mode upon completion of step (d).

2. The device for performing a programmed recording method as claimed in claim 1, further comprising the step of determining whether a condition for said programmed recording is satisfied if it is determined that said current time reaches said recording time for said programmed recording at said step (a).

3. The device for performing a programmed recording method as claimed in claim 1, further comprising the step of performing said programmed recording of a television broadcasting signal by selecting said programmed channel if it is determined that said current mode is not said CATV broadcast recording mode at said step (b).

* * * * *